(12) United States Patent
Kawai et al.

(10) Patent No.: US 6,385,839 B2
(45) Date of Patent: May 14, 2002

(54) FRONT DOOR WEATHER STRIP AND MANUFACTURING METHOD THEREFOR

(75) Inventors: Katsunori Kawai, Aichi; Hisao Hanabusa, Bisai; Takao Nakajima, Inazawa, all of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/803,940

(22) Filed: Mar. 13, 2001

Related U.S. Application Data

(62) Division of application No. 09/249,198, filed on Feb. 12, 1999, now Pat. No. 6,250,018.

(30) Foreign Application Priority Data

Feb. 13, 1998 (JP) .............................................. 10-31725

(51) Int. Cl.[7] .............................. B23P 11/02; E06B 7/16; E06B 3/00
(52) U.S. Cl. .......................... 29/451; 49/479.1; 49/506; 267/167
(58) Field of Search ............................... 49/479.1, 498.1, 49/475.1, 440, 441, 506; 277/921, 628, 645, 648, 906; 298/451; 264/167

(56) References Cited

U.S. PATENT DOCUMENTS

| | | |
|---|---|---|
| 4,531,326 A | 7/1985 | Ballocca et al. ............... 49/497 |
| 4,576,773 A | 3/1986 | Azzola et al. ............... 264/167 |
| 4,619,077 A | 10/1986 | Azzola et al. ............... 49/497 |
| 4,960,375 A | 10/1990 | Saito et al. ............... 267/167 X |
| 4,964,620 A | 10/1990 | Omura et al. ............... 267/167 X |
| 4,979,333 A | 12/1990 | Goto et al. ............... 49/479.1 X |
| 4,998,946 A | 3/1991 | Nozaki ................... 49/498.1 X |
| 5,067,280 A | 11/1991 | Arima ......................... 49/498.1 |
| 5,099,612 A | 3/1992 | Hayashi et al. ............. 49/479.1 |
| 5,240,664 A | 8/1993 | Hayashi et al. ............. 264/167 |
| 5,447,670 A | 9/1995 | Ito et al. .................. 264/167 X |
| 5,626,383 A | 5/1997 | Lee et al. ............... 49/490.1 X |
| 5,715,632 A | 2/1998 | Nozaki ....................... 49/475.1 |
| 5,958,318 A | 9/1999 | Hayashi ....................... 264/197 |

FOREIGN PATENT DOCUMENTS

| | | |
|---|---|---|
| EP | 407364 A1 | 1/1991 |
| JP | 1-168346 | 11/1989 |
| JP | 2-26934 | 2/1990 |

*Primary Examiner*—Daniel P. Stodola
*Assistant Examiner*—Hugh B. Thompson
(74) *Attorney, Agent, or Firm*—Pillsbury Winthrop LLP

(57) ABSTRACT

A method for manufacturing a front door weather strip includes continuously forming one extrusion molding section by extrusion molding corresponding to a region from an upper section of the front door to the rear side section of the front door and forming a mold molding section corresponding to a corner of a rear side upper section of the front door used a mold so as to connect both ends of the extrusion molding section, thereby manufacturing the front door weather strip.

7 Claims, 4 Drawing Sheets

FRONT DOOR WEATHER STRIP AND MANUFACTURING METHOD THEREFOR

CROSS-REFERENCE TO RELATED APPLICATIONS

The present application is a divisional of U.S. application of Kawai, Ser. No. 09/249,198 filed Feb. 12, 1999, now U.S. Pat. No. 6,250,018, which in turn claims priority from Japanese patent Application No. 10-31725 filed on Feb. 13, 1998, and the entirety of each are hereby incorporated into the present application by reference.

BACKGROUND OF THE INVENTION

1. Field of the Invention

This invention relates to a method of manufacturing a front door weather strip, and more particularly to a front door weather strip which comprises a base section which is mounted on the periphery of a front door of a vehicle, and a hollow sealing section which is extended from the base section. The front door weather strip is annular as a whole.

2. Description of the Related Art

Heretofore, a front door weather strip is mounted on the periphery of a front door of a vehicle to seal the gap between the front door and the vehicle body. In the weather strip of this type, its mainly substantially straight part is formed by extrusion molding, and its corner part small in the radius of curvature is formed by using a mold (hereinafter referred to as "mold molding", when applicable) (cf. Japanese Utility Model Publication No. Hei. 1-168346, Japanese Utility Model Publication No. Hei. 2-26934, or the like). The weather strip fundamentally comprises a base section which is mounted on the periphery of a front door, and a hollow sealing section which is extended from the base section, and is formed, for instance, with EPDM solid rubber or sponge rubber.

FIG. 8 is a side view of a conventional front door weather strip. As shown in FIG. 8, the weather strip 70 comprises three extrusion molding sections (a first extrusion molding section 71, a second extrusion molding section 72, and a third extrusion molding section 73); and three mold molding sections (a first mold molding section 74, a second mold molding section 75, and a third mold molding section 76) which connect the ends of those three extrusion molding sections and are shown by dotted lines in FIG. 8. The reason why the mold molding sections 74 through 76 are provided is as follows: If the whole weather strip is formed by extrusion molding, it suffers from the following trouble. In the case where the corner is small in the radius of curvature and it is desired to curve the extrusion molding section along the corner section, the corner section is deformed in such a manner that the hollow sealing section collapses; that is, a predetermined sealing force cannot be obtained. The extrusion molding sections are greatly different in sectional configuration from each other and the mold molding section is provided at the junction of the extrusion molding sections.

FIG. 9 is a sectional view taken along line IX—IX in FIG. 8. FIG. 10 is a sectional view taken along line X—X in FIG. 8. FIG. 11 is a sectional view taken along line XI—XI in FIG. 8. As shown in those figures, the first extrusion molding section 71 corresponding to the region from the upper section to the front side section of the front door, as was described before, fundamentally comprises a base section 77, and a hollow sealing section 78 which is integral with an outwardly protruded seal lip 79, and a rear surface seal 80. On the other hand, the second extrusion molding section 72 corresponding to the front side section of the front door has no seal lip 79. And in the second mold molding section 75, the seal lip 79 is gradually changed in length, and the seal lip 79 is eliminated at the junction of the second extrusion molding section 72 and the second mold molding section 75.

The above-described weather strip 70 has the following problems: The front door weather strip needs three extrusion molding sections 71, 72 and 73, and three mold molding sections 74, 75 and 76. Therefore, those sections 71 through 76 must be formed in different manufacturing steps, and accordingly the number of manufacturing steps is considerably large; that is, the manufacturing work is low in efficiency, and the manufacturing cost is high.

On the other hand, a method may be employed in which the second mold molding section 75 and the third mold molding section 76, which are relatively larger in the radius of curvature than the first mold molding section 76, are eliminated, and the part corresponding to the upper section, the front side section, lower section and the rear side section of the front door is provided as one extrusion molding section. However, in this case, as was described above, the hollow sealing section of the part corresponding to the corner section between the front side section and the lower section of the front door is deformed in such a manner that the hollow sealing section collapses; that is, the predetermined sealing force cannot be obtained.

SUMMARY OF THE INVENTION

In view of the foregoing, an object of the invention is to provide a front door weather strip and its manufacturing method wherein the manufacturing work is high in efficiency, and manufacturing cost is low, and substantially the same sealing force is obtained at any point of the weather strip.

To achieve the forgoing object, according to one aspect of the present invention, there is provided a front door weather strip provided with a base section mounted on a periphery of a front door of a vehicle, and a hollow sealing section extended from the base section. The weather strip has an annular shape as a whole, and the base section and the hollow sealing section are formed all over a periphery of the weather strip. Further, the weather strip comprises a mold molding section corresponding to a corner of a rear side upper section of the front door, the mold molding being formed with a mold, and an extrusion molding section being formed continuous by extrusion molding. The extrusion molding section comprises: a first part corresponding to a region of from an upper section to a front side section of the front door, the first part having a seal lip; a second part corresponding to a corner part between the upper section and the front side section of the front door; a third part corresponding to the front side section; a fourth part corresponding to a corner part between the front side section and a lower section of the front door, a height of the hollow sealing section at the fourth part is larger than other parts in the weather strip; and a fifth part corresponding to the lower section and a rear side section of the front door. A base end of the sealing section on a vehicle outside at least the lower section of the fifth part is smaller in thickness than that of a part in the first part corresponding to the upper section of the front door.

In a preferred embodiment, a length of the seal lip is gradually changed so as to become zero at the second part.

In another preferred embodiment, both side walls of the hollow sealing section at the fourth part are added to a same volume substantially uniformly thickness, so that a height of the hollow sealing section at the fourth part is larger than other parts in the weather strip.

According to another aspect of the present invention, there is provided a method for manufacturing a front door weather strip provided with a base section mounted on a periphery of a front door of an automobile, and a hollow sealing section extended from the base section. The weather strip has an annular shape as a whole, the base section and the hollow sealing section are formed all over a periphery of the weather strip. The method comprises: (A) continuously forming one extrusion molding section by extrusion molding, comprising the steps of: forming a first part corresponding to a region of from an upper section to a front side section of the front door, the first part having a seal lip integral with the hollow sealing section; forming a second part corresponding to a corner part between the upper section and the front side section of the front door, a length of the seal lip being gradually changed so as to become zero, and the hollow sealing section being changed to a substantially circular shape from a shape of the hollow sealing section at the first part; forming a third part corresponding to the front side section, the hollow sealing section being changed to an elliptic shape from the substantially circular shape of the hollow sealing section at the second part; forming a fourth part corresponding to a corner section between the front side section and a lower section of the front door, a height of the hollow sealing section at the second part is larger than other parts in the weather strip; and forming a fifth part corresponding to the lower section and a rear side section of the front door, wherein a base end of the sealing section on a vehicle outside in at least the lower section of the fifth part is smaller in thickness than that of a part in the first part corresponding to the upper section of the front door; and (B) forming a mold molding section corresponding to a corner of a rear side upper section of the front door using a mold so as to connect both ends of the extrusion molding section, thereby manufacturing the front door weather strip.

In a preferred embodiment, the step (A) is executed using an extrusion molding machine having a die of which an opening is variable in configuration.

According to the present invention, the front door weather strip is annular as a whole, and its base section is attached to the periphery of the front door of the vehicle. And the hollow sealing section extended from the base section seals the gap between the front door and the vehicle body.

In the invention, the weather strip is made up of one extrusion molding section and one mold molding section through which both end of the extrusion molding section are connected to each other. Hence, the number of manufacturing steps is considerably small.

In addition, the part of the extrusion molding section which corresponds to the region of from the upper section of the front door to the front side section has the seal lip which is formed integral with the sealing section, and the length of the seal lip is gradually changed at a corner part between the upper section and the front side section.

Furthermore, in the part which corresponds to the corner section between the front side section and the lower section of the front door, the hollow sealing section is larger in height than the other parts. Therefore, even if, when the weather strip is fixed to the front door, the part is bent and therefore the sealing section collapses somewhat; that is, it is deformed, the deformation is estimated in advance. That is, when the extrusion molding section is bent, the height of the sealing section of the part thus deformed is almost equal to the height of the other part. Accordingly, the sealing force will never be decreased.

In the part which corresponds to the upper section of the front door, in order to prevent the suction deformation of the door during the high speed traveling, it is necessary to obtain a predetermined lap margin and to increase the sealing force. Therefore, the sealing section should have a predetermined thickness. On the other hand, if the sealing force is too high, the front door closing force is increased.

Therefore, the present invention has the above-described function and the following function. In the part which corresponds to the lower section of the front door, a base end of the sealing section on a vehicle outside in at least lower section of the fifth part is smaller in thickness than that of a part in the first part corresponding to the upper section of the front door. Therefore, the front door closing force is not increased so much. Hence, the above-described function is more positively obtained.

Still further, the front door weather strip which performs the function of the invention described herein can be positively obtained by a method according to the present invention.

DETAILED DESCRIPTION OF THE PREFERRED EMBODIMENTS

A front door weather strip, which constitutes an embodiment of the invention, will be described with reference to FIG. 1 through FIG. 7.

Figure 1:
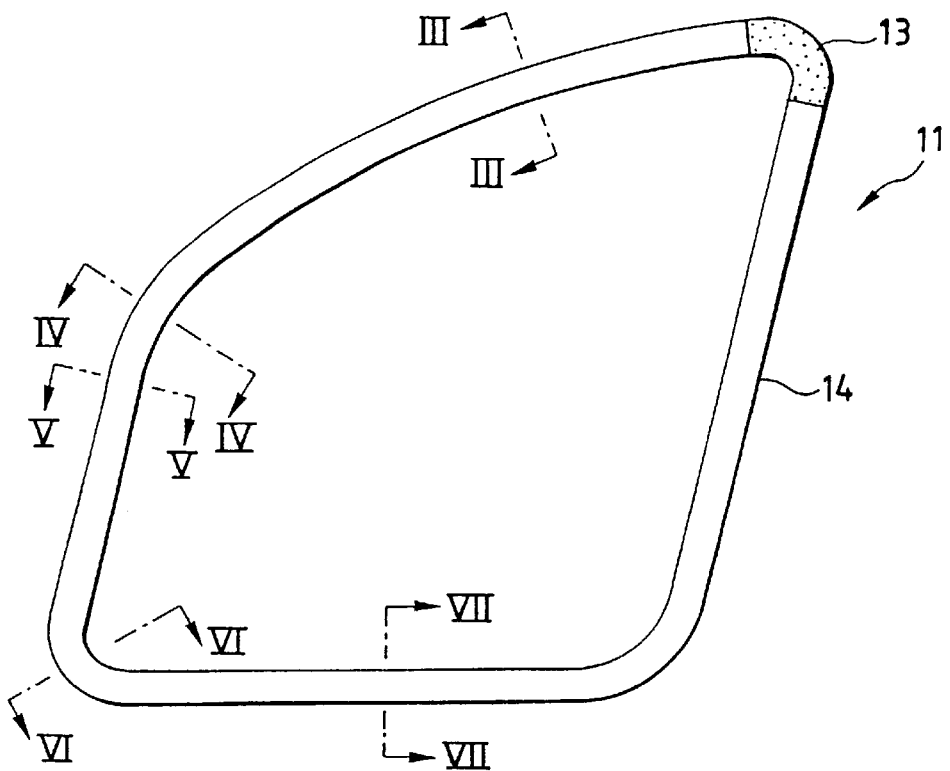
FIG. 1 is an explanatory side view showing a front door weather strip, which constitutes an embodiment of the invention.
Figure 2:
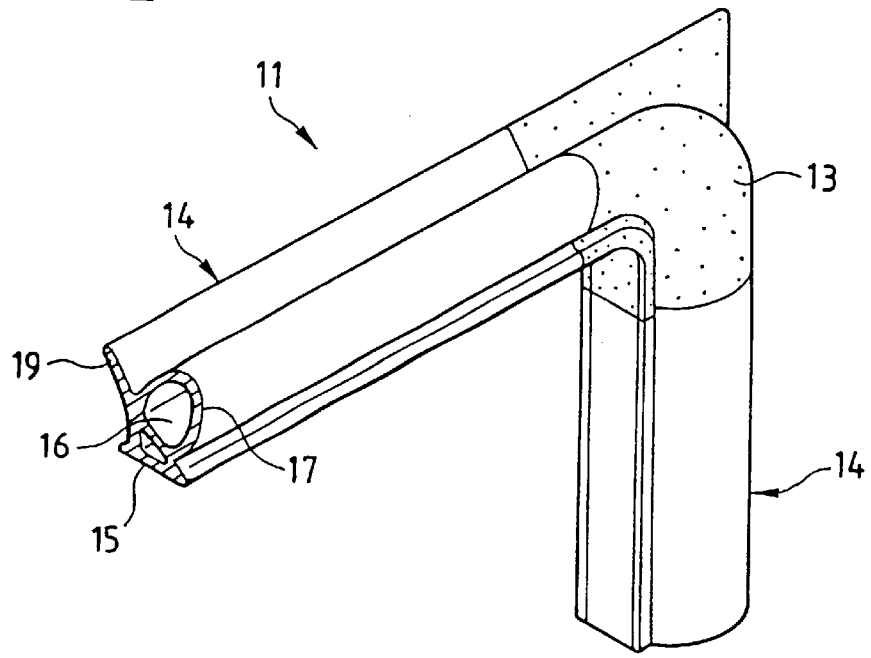
FIG. 2 is a perspective view mainly showing a mold molding section of the weather strip.
Figure 3:
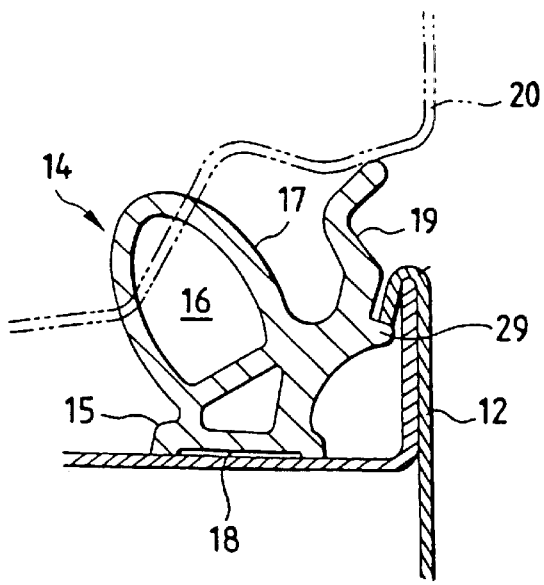
FIG. 3 is a sectional view taken along line III—III of FIG. 1, showing the coupling of the weather strip to the front door.

As shown in FIGS. 1 and 3, the front door weather strip (hereinafter referred to as "a weather strip" when applicable) 11 is mounted on the door frame 12 of the vehicle front door, and is annular as a whole, wherein the door frame 12 has an exterior door edge 12a. The weather strip 11 comprises: one mold molding section 13 (cf. FIG. 2) which is positioned on the corner section of the rear side upper section; and one extrusion molding section 14 which is formed by extrusion molding. The mold molding section 13 is so formed as to connect both ends of the extrusion molding section 14. In the embodiment, the weather strip 11 is made of EPDM (ethylene-propylene-dime terpolymer) sponge rubber.

The extrusion molding section 14 is fundamentally made up of a base section 15 which is mounted on the door frame 12, and a sealing section 17 which is extended from the base section 15 and has a hollow interior 16 (the mold molding section 13 being the same in fundamental construction). The base section 15 is secured to the door framed 12 through an adhesive double coated tape 18 or with a clip (not shown).

Figure 4:
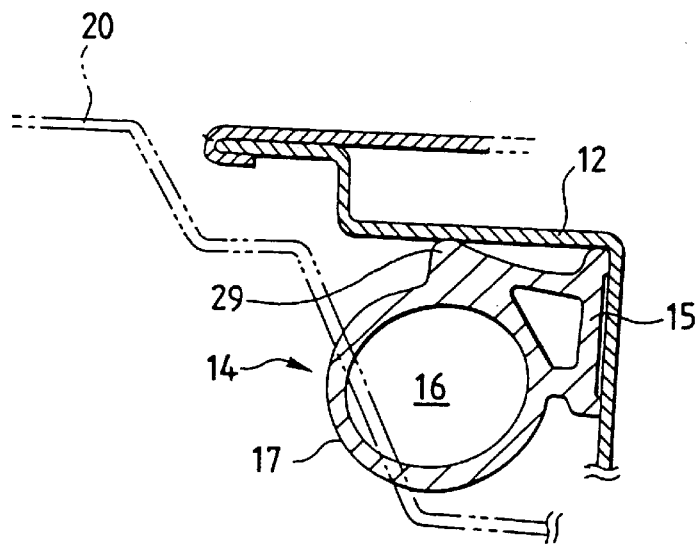
FIG. 4 is a sectional view taken along line IV—IV of FIG. 1 showing the coupling of the weather strip to the front door.
Figure 5:
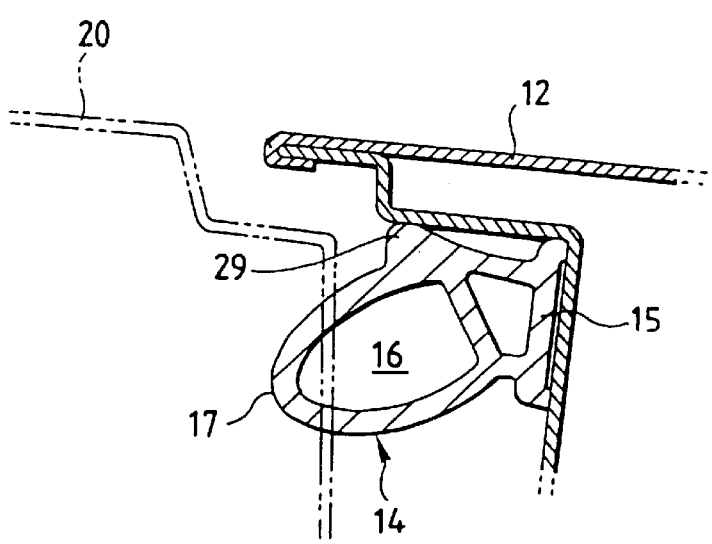
FIG. 5 is a sectional view taken along line V—V of FIG. 1 showing the coupling of the weather strip to the front door.

As shown in FIG. 3, the part of the extrusion molding section 14 which corresponds to the region of from the upper section of the door frame 12 to the front side section (on the left side of FIG. 1) is so formed that a seal lip 19 and a rear surface lip 29 are extended outwardly with respect to the sealing section 17 and are integral with each other. Hereinafter, this parts is defined as a first part for the explanation. As shown in FIG. 4, the length of the seal lip 19 is gradually decreased at a corner part between the upper section (the first part) and the front side section. Hereinafter, this corner part is defined as a second part. The sealing section 17 at the second part is substantially circular in section. That is, the sectional shape of the sealing section 17 is changed from substantial ellipse at the first part to substantial circle at the second part. Further, a contact portion with a vehicle body 20 is a side portion adjacent to the top portion of the sealing section 17 at the first part, however, it is changed to a top portion (a portion most separate from the base section) of the circular section of the sealing section 17 at the second part. In addition, as shown in FIG. 5, in the part of the extrusion molding section 14 which corresponds to the front side section (the part which corresponds to the hinge of the front door), no seal lip 19 is formed, and the rear surface lip 29 is short. Hereinafter, this part is defined as a third part. The sealing section 17 at the third part is changed in section from the second part, so the sealing section 17 at the third part is so formed that it is elliptic in section, and is extended obliquely.

Figure 6:
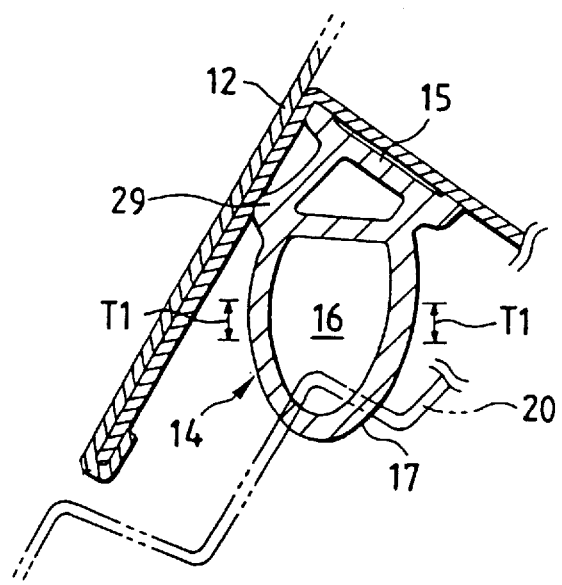
FIG. 6 is a sectional view taken along line VI—VI of FIG. 1 showing the coupling of the weather strip to the front door.

As shown in FIG. 6, in the part of the extrusion molding section 14 which corresponds to the corner part between the front side section and the lower section of the door frame 12, the height of the sealing section is larger than that of the other section (the front side section and the lower section). Hereinafter, this lower corner part is defined as a fourth part. That is, with respect to the part corresponding to the aforementioned corner, during extrusion molding, both side walls of the sealing section 17 are added to the same value substantially uniformly thickness over the height T1, and therefore the sealing section 17 is higher than the other sections.

Figure 7:
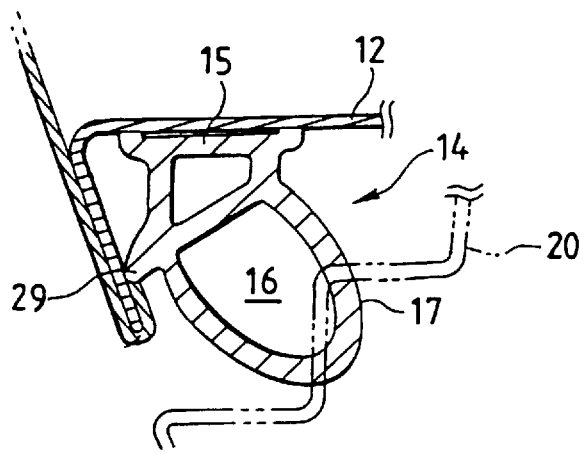
FIG. 7 is a sectional view taken along line VII—VII of FIG. 1 showing the coupling of the weather strip to the front door.
Figure 8:
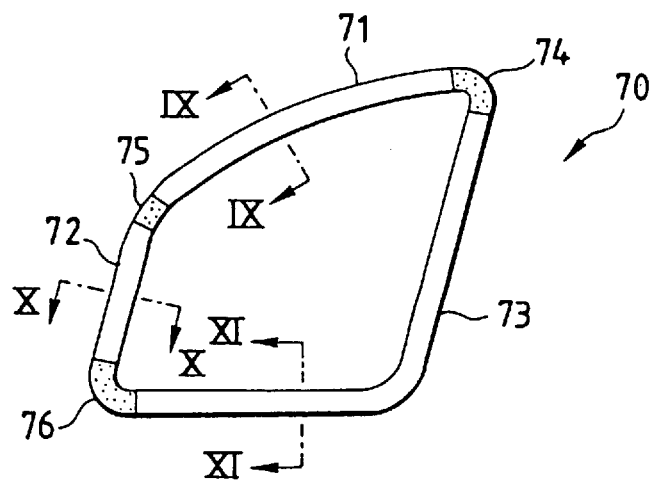
FIG. 8 is an explanatory side view showing a conventional front door weather strip.
Figure 9:
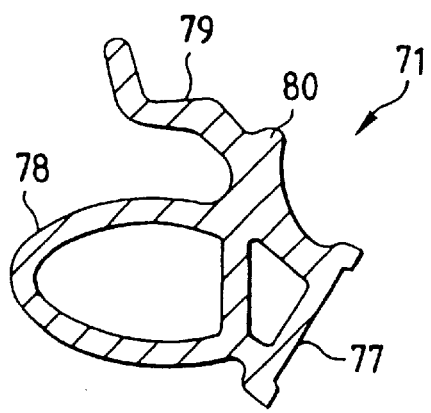
FIG. 9 is a sectional view taken along line IX—IX in FIG. 8.
Figure 10:
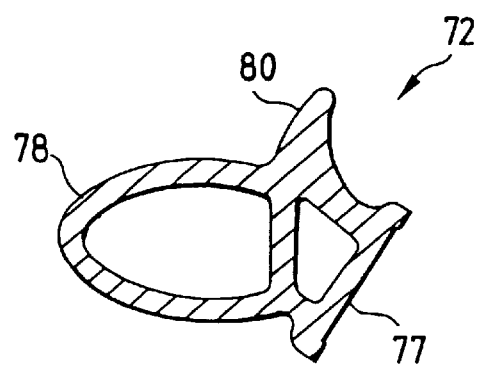
FIG. 10 is a sectional view taken along line X—X in FIG. 8.
Figure 11:
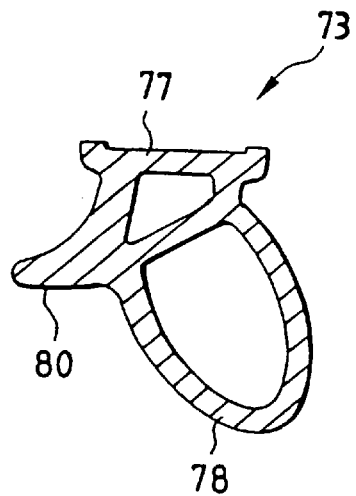
FIG. 11 is a sectional view taken along line XI—XI in FIG. 8.

As shown in FIG. 7, in the part of the extrusion molding section 14 which corresponds to the lower section and a rear side section of the door frame 12 (Hereinafter, this portion is defined as a fifth part.), and in at least the lower section of the fifth part, its thickness is smaller than the thickness of the vehicle outside base end of the sealing section 17 of the part which corresponds to the upper section of the door frame 12.

A process of manufacturing the weather strip thus constructed will be described in brief. Devices used for the manufacture of the weather strip are not shown.

First, an extrusion molding machine is used, to extrude not-vulcanized EPDM having a sectional configuration of the aforementioned extrusion molding section 14 through a die having a predetermined opening. In this case, a variable extrusion mechanism is used to cause the extrusion molding section 14 to have the above-described various sectional configurations. That is, the configuration of the extrusion opening of the die is variable according to the sectional shape of the weather strip.

Thereafter, the not-vulcanized EPDM thus extruded is vulcanized with the vulcanizing machine, and then cooled.

Under this condition, a metal mold device is used to form the mold molding section 13 in such a manner as to connect both ends of the extrusion molding section 14. Thus, the above-described annular weather strip 11 has been manufactured.

Now, the functions and effects of the embodiment will be described.

(1) In the use of the weather strip 11, the hollow sealing section 17 extended from the base section 15 seals the gap between the door frame 12 and the vehicle body 20.

(2) The weatherstrip 11, the embodiment of the invention, is made up one extrusion molding section 14 and one mold molding section 13. Therefore, the number of manufacturing steps is considerably small. Accordingly, the manufacturing work is high in efficiency, and the manufacturing cost is very low.

(3) In the region of from the upper section of the door frame 12 to the front side section (first part) has the sealing lip 19. Then, the seal lip 19 of the second part of the extrusion molding section 14 which corresponds to the upper corner part between the upper section of the door frame 12 and the front side section is so formed that its length is gradually decreased. Therefore, sealing force of the seal lip 19 may be equalized at the upper section of the door frame.

(4) Further, the third part of the extrusion molding section 14 corresponds to the front side section of the door frame 12. The sealing lip 19 is not formed at the third part. Therefore, it is possible to narrow the gap between the front side section and the vehicle body as compared with the gap at the first part. And it is possible to form a shape of the sealing section to be the same as that of the conventional-type weather strip while the weather strip is formed by one continuous extrusion molding.

(5) Furthermore, the fourth part of the extrusion molding section 14 which corresponds to the lower corner part between the front side section of the door frame 12 and the lower section is so formed that the height of the sealing section 17 is higher than the other parts (FIG. 6). Therefore, even if, when the weather strip is mounted on the door frame 12, the fourth part is bent and the sealing section 17 collapses somewhat; that is, it is deformed, the deformation is estimated in advance. That is, when the extrusion molding section 14 is bent, the height thereof is almost equal to the heights of the other parts. Accordingly, the sealing force will never be decreased.

(6) Especially, the fourth part corresponding to the lower corner part is as follows: in the extrusion molding work, both side walls of the sealing section 17 are added with the same value of substantially uniformly thickness, so that the height of the sealing section 17 is higher than the other sections. Hence, when the extrusion molding section is bent, the sealing section 17 thereof will collapse; that is, the right and left parts thereof are uniformly deformed. Accordingly, the above-described functions and effects are more positive.

(7) In addition, in the region corresponding to the upper section of the door frame 12, in order to deal with the suction deformation of the front door during the high speed traveling, it is necessary to obtain a predetermined lap margin there by to increase the sealing force. Therefore, the sealing section 17 should have a predetermined thickness. On the other hand, the part corresponding at least to the lower section of the door frame 12, is less in the above-described requirement than the part corresponding to the upper section. On the other hand, if the whole sealing force is too great, the front door closing force is increased.

(8) In view of the foregoing, the thickness of the fifth part which corresponds at least to the lower section of the door frame 12 is smaller than the thickness of the vehicle outside base end part of the sealing section 17 of the part corresponding to the upper section, and therefore, the front door closing force can be decreased. As a result, at the time of closing the door, the operability is improved.

(9) And, because of this fact, the amount of material used can be decreased as a whole. As a result, the amount of EPDM used can be decreased, and the manufacturing cost can be decreased.

(10) In the embodiment, in addition to the above-described functions and effects of (3) through (6) and (8), the following sealing effect is obtained: that is, at any section sealing effect is substantially equal.

(11) In the method of manufacturing the weather strip 11 according to the invention, the weather strip 11 having the above-described functions and effects can be positively obtained.

The invention is not limited to the above-described embodiment; that is, it will be obvious to those skilled in the art that various changes and modifications may be made therein without departing from the spirit of the invention as follows:

(a) In the above-described embodiment, the weather strip 11 is made of one kind of rubber (EPDM sponge rubber). The material maybe suitably replaced other materials. For instance, the mold molding section 13 may be formed with EPDM solid rubber or thermoplastic elastomer.

(b) In the above-described embodiment, in the part of the extrusion molding section 14 which corresponds to the upper corner part between the upper section of the door frame 12 and the front side section, the length of the seal lip 19 is gradually decreased. However, in all the regions of the upper section, if the sealing force of the seal lip 19 will be equal, the seal lip 19 may be gradually changed in length.

As was described above, with the front door weather strip according to the present invention, the manufacturing work is improved in efficiency, and the manufacturing cost is decreased. And any parts of the weather strip are substantially equal in sealing performance.

Furthermore, any parts of the weather strip are more positively equal in sealing performance.

In addition, according to the front door weather strip manufacturing method according to the present invention, the weather strip having the above-described effects can be positively obtained.

What is claimed is:

1. A method for manufacturing a weather strip mountable on a vehicle front door having an exterior door edge, including forming a molded section corresponding to a corner of a rearward upper section of the front door and forming a continuous extrusion molding section comprising a base section and a hollow sealing section extending from the base section, wherein forming the continuous extrusion molding section comprises:

forming a first part corresponding to a region from an upper section to a corner part of a frontward upper section of the front door, the first part having a seal lip;

forming a second part corresponding to the corner part between the upper section and a frontward section of the front door;

forming a third part corresponding to the frontward section of the front door;

forming a fourth part corresponding to a corner part between the frontward section and a lower section of the front door; and forming a fifth part corresponding to the lower section and a rearward section of the front door, so that the fifth part has a first side wall of the hollow sealing section and the first part has a second side wall of the hollow sealing section, each of the fifth part and the first part having a respective base portion adjacent to an end of the hollow sealing section, so that a part of the base portion of the first side wall corresponding to the lower section of the fifth part is smaller in thickness than the base portion of the second side wall of the first part; and mounting the weather strip on the front door so as to place the first side wall in closer proximity to an exterior door edge than the second side wall.

2. The method of claim 1, wherein forming the continuous extrusion molding section includes using an extrusion molding machine having a die with an opening of variable configuration.

3. The method of claim 1, wherein forming the fourth part includes forming side walls of the hollow sealing section at the fourth part of equal and substantial uniform thickness.

4. The method of claim 1, wherein the hollow sealing section of each part has a height and forming the continuous extrusion molding section further comprises forming the fourth part with the hollow sealing section greater in height than the heights of the hollow sealing sections at the first, second, third, and fifth parts.

5. The method of claim 4, wherein forming the continuous extrusion molding section further comprises forming the seal lip integrally with the hollow sealing section, wherein the seal lip protrudes by a fixed amount along the first part, with protruding portion gradually decreasing until it disappears in the second part.

6. A method for manufacturing a weather strip for use on an automobile front door including forming the weather strip with a mold molding section and a continuous extrusion molding section, the method including forming the continuous extrusion molding section by extrusion molding a predetermined length of material to include a base section, a hollow sealing section extending from the base section, and a seal lip extending from at least a portion of the base section and the hollow sealing section, wherein the method of forming the continuous extrusion molding section comprises:

forming a first part corresponding to region from an upper section to a corner part of a frontward upper section of the front door, the first part having the seal lip integrally formed with the hollow sealing section;

forming a second part corresponding to the corner part between the upper section and a frontward section of the front door, so that the seal lip has a protruding portion that protrudes by a fixed amount along the first part, with the protruding portion gradually decreasing until it disappears in the second part;

forming a third part corresponding to the frontward section of the front door;

forming a fourth part corresponding to a corner section between the frontward section and a lower section of the front door; and forming a fifth part corresponding to the lower section and a rearward section of the front door.

7. A method for manufacturing a weather strip for use on a vehicle front door, including forming the weather strip having an annular shape with a mold molding section and a continuous extrusion molding section, the method including forming the continuous extrusion molding section by extrusion molding a predetermined length of material to include a base section, a hollow sealing section extending from the base section, and a seal lip extending from at least a portion of the base section and the hollow sealing section, wherein the method of forming the continuous extrusion molding section comprises:

forming a first part corresponding to a frontward section of the front door frame extending from an upper section to a corner part of the frontward section of the front door;

forming a second part corresponding to the frontward section of the front door frame extending from the corner part between the upper section and the frontward section of the front door;

forming a third part corresponding to the frontward section of the front door;

forming a fourth part corresponding to a corner section between the frontward section and a lower section of the front door, and forming a fifth part corresponding to the lower section and a rearward section of the front door, so that the seal lip protrudes by a fixed amount along said first part, with the protruding portion gradually decreasing until it disappears at said second part.

* * * * *